United States Patent [19]
Demichelis

[11] 4,016,946
[45] Apr. 12, 1977

[54] METHOD AND DEVICE FOR DRIVING THE DRIVING WHEELS OF A VEHICLE

[75] Inventor: Jacques A. Demichelis, Paris, France

[73] Assignee: FORATRAC "Societe Civile", Paris, France

[22] Filed: Oct. 17, 1975

[21] Appl. No.: 623,222

[30] Foreign Application Priority Data

Oct. 17, 1974 France .............................. 74.34957

[52] U.S. Cl. ................................................. 180/74
[51] Int. Cl. ............................................ B60k 23/00
[58] Field of Search .............. 180/74, 24.12, 24.08; 301/6 D, 6 R; 305/11, 57

[56] References Cited

UNITED STATES PATENTS

| 1,198,098 | 3/1916 | Bergh | 180/74 |
| 2,124,708 | 7/1938 | Peter | 180/74 |
| 2,717,654 | 9/1955 | Andersen | 180/74 |
| 3,275,091 | 9/1966 | Steck et al. | 180/74 |
| 3,433,002 | 3/1969 | Custance | 180/74 |
| 3,639,012 | 1/1972 | Cushman et al. | 305/11 |
| 3,788,420 | 1/1974 | Lacroix | 180/74 |
| 3,881,565 | 5/1975 | Parrish | 180/24.12 |
| 3,923,112 | 12/1975 | Goodgame | 180/74 |

FOREIGN PATENTS OR APPLICATIONS 1,430,950  3/1969  Germany .............................. 180/74

*Primary Examiner*—Samuel Scott
*Assistant Examiner*—Allan R. Burke
*Attorney, Agent, or Firm*—Sughrue, Rothwell, Mion, Zinn & Macpeak

[57] ABSTRACT

A method and device are provided for simultaneously driving two driving wheels of a vehicle by means of a driving roller meshing with both wheels. This roller is formed of star-shaped flanges carrying bars which engage the sculptures of the tires, so as to push out the dirt collected on the tires. This dirt is easily evacuated between the arms of the roller flanges. The invention applies to the drive of any tandem set of wheels, including those of tracked vehicles and heavy vehicles.

6 Claims, 4 Drawing Figures

U.S. Patent
April 12, 1977
4,016,946
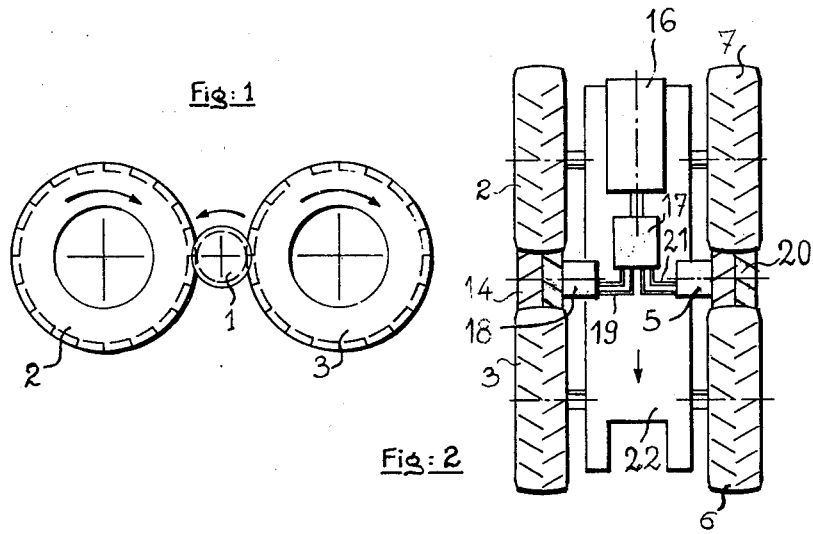
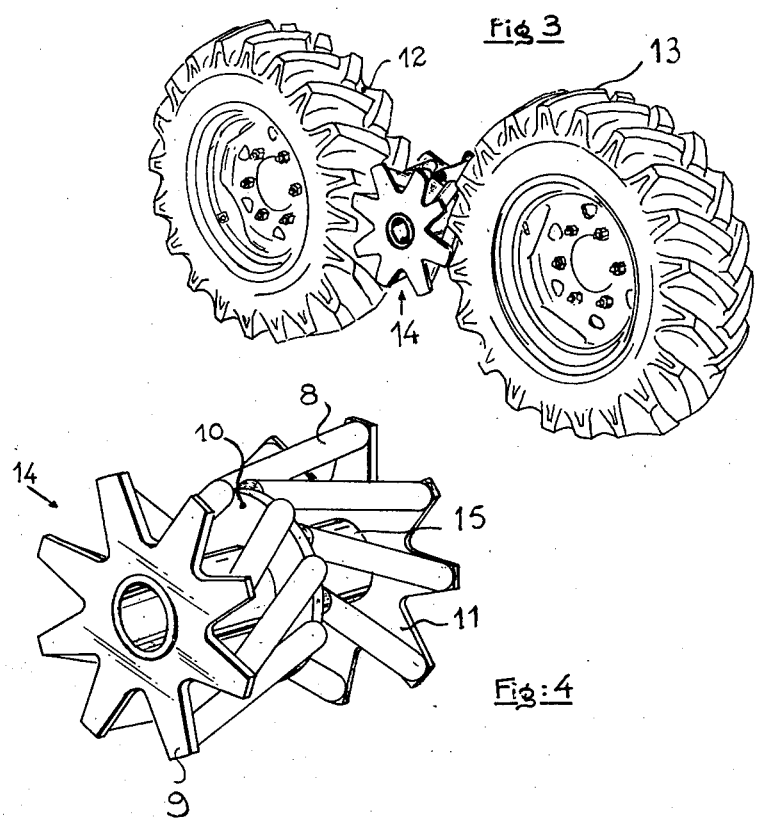

METHOD AND DEVICE FOR DRIVING THE DRIVING WHEELS OF A VEHICLE

This invention relates to a method and device for driving the driving wheels of a vehicle.

A well known method consists in driving a wheel by means of a driving roller which is pressed against the wheel tire. However, this method is not applicable to heavy vehicles, such as trucks or tractors. It could be envisioned to use a driving roller which would engage two wheels of a tandem set of wheels, so as to obtain a tight fit of the roller between the wheels and to ensure a positive drive of the wheels by the roller. Experience has shown, however, that any drive roll system associated with one or two wheels is not capable of providing an effective drive, unless the vehicle load is relatively light and it is driven over a sufficiently firm soil.

The purpose of the present invention is to achieve a method for effectively driving the driving wheels of a vehicle by means of a driving roller, even in the case of a heavily loaded vehicle and when driving over any type of ground. The method according to the present invention is characterized in that the driving of the wheels is achieved both by maintaining the driving roller between two wheels and by causing, at any time, at least two bars which are integral with the roller to respectively engage a sculpture of the tire of either wheel.

Thus, the pressure exerted by the wheels on the driving roller has no longer the role of developing frictional forces for allowing the roller to drive the wheels, but its role is now to expell the dirt collected between the ribs of the tires. This brings about a dual advantage: first, providing a better adherence of the tires on thick muddy soils, since with every turn of a wheel its sculptures are cleared of the collected dirt, and on the other hand, providing for an effective drive of the wheels through the action of the roller bars upon the leading faces of the tire ribs, as this action proceeds upwards from the base of each rib until the bar disengages itself.

Another object of the invention is to provide a drive roller for carrying out the above method, this roller being characterized by each bar being fixed laterally to two flanges integral with a drive shaft, the smallest distance between one bar and the external surface of the roller shaft being larger than the height of the tire rib with which this bar meshes.

This cage-like arrangement provides for an effective application of the driving method, since each rib of the tire can penetrate completely between two bars.

A further object of the invention is a roller of the above type, in which the flanges carrying the bars are star-shaped, the bars being fixed to the tip of each branch in order to allow for an easy evacuation of the dirt expelled from the sculptures by the pressure exerted in each of these by the bars.

There is thus provided a particularly well suited means for applying the driving method set forth. It will be clear that, according to the design of the tire sculptures, the number and arrangement of the bars may be varied, including the possibility to add an intermediary flange when, for instance, a tire carries two different sets of ribs.

Yet another object of the invention is a device for carrying out the above method, in which the axis of each driving roller is located in the same plane as the axes of the diving wheels.

This affords a mutual compensation of the stresses resulting from the pressure of the tires against the roller.

It will be noted that, irrespective of the choice of arrangement and roller type, the new method leads to the design of vehicles featuring a very substantial simplification of the transmission system, since two driving rollers are sufficient for achieving a four-wheel drive, whereas conventional vehicles require a motor and a transmission means for each wheel, even in those vehicles provided with hydraulic drives. By associating each roller with a motor, such as e.g. an hydraulic motor, the number of motors will be halved. Moreover, the handling of vehicles provided with a drive according to the invention is easy, since it will be sufficient, in the case, for instance, of a four-wheel-drive vehicle, to brake one of the two motors driving the rollers to steer the vehicle around.

It will also be noted that, since the wheels are driven from their circumference, the final reduction ratio is found at the last stage of the kinematic sequence. This allows for a lighter structure of all the mechanical elements proceeding this final stage. The fixation of the wheels to the vehicle frame becomes simplified to the utmost, which results in a greater sturdiness and facilitates the transformation of the vehicle into an amphibian vehicle, by simply affixing paddles to the wheels equipped as described.

Further advantages and features will be apparent from the following description, reference being made to the appended drawing which shows, by way of example, one embodiment of the device for carrying out the method of the invention.

In the drawing:

FIG. 1 is a diagrammatic front view of a roller driving two driving wheels,

FIG. 2 is a diagrammatic view, from above, of a four-wheel-drive vehicle, in which the wheels are driven by two rollers, FIG. 3 is a perspective view of the combination of one drive roller with its two driving wheels, and FIG. 4 is a perspective view of a roller for tires of the type carrying multiple sculptures.

The principle of the method of driving the driving wheels of a vehicle is illustrated by FIG. 1. The roller 1 has its axis preferably located in the same plane as the axes of the wheels equipped with pneumatic tires 2 and 3, so as to afford a mutual compensation of the pressure-induced stresses. This roller may be of any type meshing with the sculptures of the tires.

Roller 1 will therefore comprise, in the simplest case, a set of teeth, at least one of which penetrates into a sculpture of tire 2 while another tooth is engaged within a sculpture of tire 3.

FIGS. 3 and 4 show an example of a roller to be used in the case of multiple sculptures 12 slanting alternatively in opposite directions from the median line of the tire.

In this embodiment, the roller 14 comprises bars 8 which may or not be rubber-coated, held alternatively between flanges 10 and 11 and flanges 9 and 10, the two sets of bars on either sides of median flange 10 having opposed slants. In this way, roller 14 is in constant mesh with the tires, the bars 8 penetrating into the sculptures 12 and pressing against the flank 13 of one of these sculptures.

To allow vehicles to drive on particularly sticky soils, the bars 8 are preferably mounted on the tips of the arms of star-shaped flanges 9 and 11. Additionally, the distance from the bars 8 to the external diameter of the shaft 15 of the roller 14 is sufficient for allowing the dirt which may stick to the sculptures 12 and to their flanks 13 to pass through the open space between bars 8 and shaft 15 and to be discharged through the lateral openings between two adjacent arms of each flange 9 and 11.

The roller 14 may take any other shape adapted to the particular profile of the tires being used. During assembly operations, the wheels are positioned so that the sculptures of the tires mesh properly with the roller bars.

According to the dimensions and features of the vehicle equipped with wheels driven in accordance with the method of the invention, roller 14 may be driven either by an hydraulic motor 5 FIG. 2 or by a motor with an hydraulic or electrical speed-reduction unit. It is also possible to use a motor with an electrical variable-ratio coupler. Whereas these solutions are particularly advantageous, the rollers could also obviously be driven by a mechanical transmission with a differential gear.

It will be noted from FIG. 2 that the transmission for driving the four wheels 2, 3, 6 and 7 is particularly simply, since the motor 16 propells the vehicles through a single pump 17 feeding two hydraulic motors, namely motor 18 which drives roller 14 and motor 5 which drives roller 20, these tow motors being respectively connected to pump 17 by lines 19 and 21.

Power transmission from the roller to the wheels is achieved with a large speed-reduction ratio, namely from ½ to 1/6 and even more if required.

The fixation of the wheels to the vehicle frame 22 is simplified to the utmost, which results in a very sturdy construction. The driving wheels may be dual or also of the caterpiller drive type. They may also be adapted for water-borne propulsion by simply affixing paddles alongside the wheels and equipping the vehicle with floats which will be easily adapted because the dimensions of the vehicle frame are held very small.

What I claim is:

1. In an apparatus for driving the driving wheels of a vehicle through the intermediary of a tubular driving roller maintained between two driving wheels and meshing with the sculptures of the pneumatic tires of said wheels, the improvement comprising: at least one first bar-shaped member of said roller penetrating into one sculpture of a first tire and a second bar-shaped member penetrating into one sculpture of a second tire, at least one star-shaped flange coupled to one end of said roller, said bars being attached at least by one of their ends to the tips of the arms of said star-shaped flange and means disposed on said roller to couple the other ends of said bars to the roller at an angle oblique to the driving axis of said roller.

2. The apparatus according to claim 1, wherein the smallest distance between one bar and external surface of the tubular roller is greater than the height of one sculpture of the tire with which said roller is meshing.

3. The apparatus according to claim 1, wherein the bar-shaped members have a profile mating with the profile of the tire sculptures, and a second star-shaped flange coupled to the other end of said roller and said means to couple said bars comprises a flange located at the middle of said tubular roller and additional bar-shaped members coupled between said second star shaped flange and said flange at a different inclination from said first and second bar shaped members.

4. The apparatus according to claim 3, wherein the bar shaped members are rubber-lined.

5. The apparatus according to claim 3, wherein the spacing between two adjacent arms of the star shaped flange is sufficient to facilitate the evacuation of dirt collected inside the tire sculptures.

6. The apparatus according to claim 1, wherein each roller is actuated by motor means.

* * * * *